(12) United States Patent
Mayer et al.

(10) Patent No.: US 9,055,672 B2
(45) Date of Patent: Jun. 9, 2015

(54) DEVICE FOR PROTECTING AN ELECTRONIC PRINTED CIRCUIT BOARD

(71) Applicant: Compagnie Industrielle et Financiere D'Ingenierie "Ingenico", Paris (FR)

(72) Inventors: Laurent Mayer, Courdimanche (FR); Frederic Nguyen, Groslay (FR); Pascal Sulpice, Massy (FR); Didier Coquelet, Puiseux le Hauberger (FR); Franck Robert, Paris (FR); Caroline Wolff, Suresnes (FR)

(73) Assignee: Compagnie Industrielle et Financiere D'Ingenierie "Ingenico", Paris (FR)

( * ) Notice: Subject to any disclaimer, the term of this patent is extended or adjusted under 35 U.S.C. 154(b) by 200 days.

(21) Appl. No.: 13/725,146

(22) Filed: Dec. 21, 2012

(65) Prior Publication Data

US 2013/0161086 A1 Jun. 27, 2013

(30) Foreign Application Priority Data

Dec. 23, 2011 (FR) ...................................... 11 62410

(51) Int. Cl.
| | |
|---|---|
| H05K 1/02 | (2006.01) |
| H05K 5/02 | (2006.01) |
| G06F 21/71 | (2013.01) |
| H05K 1/11 | (2006.01) |
| H05K 1/14 | (2006.01) |

(52) U.S. Cl.
CPC ............ *H05K 5/0217* (2013.01); *H05K 1/0275* (2013.01); *G06F 21/71* (2013.01); *H05K 1/11* (2013.01); *H05K 1/147* (2013.01); *H05K 2201/09481* (2013.01)

(58) Field of Classification Search
CPC .......... H05K 1/11; H05K 2201/09481; H05K 1/0275; H05K 1/147; G06F 21/71; G08B 13/149
USPC .................................................. 174/260, 535
See application file for complete search history.

(56) References Cited

U.S. PATENT DOCUMENTS

| 4,811,288 | A | * | 3/1989 | Kleijne et al. .................. 365/52 |
| 5,159,629 | A | * | 10/1992 | Double et al. .................. 713/194 |
| 6,512,454 | B2 | * | 1/2003 | Miglioli et al. ................ 340/541 |
| 6,853,093 | B2 | * | 2/2005 | Cohen et al. ................... 257/678 |

(Continued)

FOREIGN PATENT DOCUMENTS

| DE | 102007057948 A1 | 6/2009 |
| GB | 2297540 A | 8/1996 |
| WO | 2009071489 A1 | 6/2009 |

OTHER PUBLICATIONS

French Search Report dated Oct. 23, 2012 for corresponding French Application No. FR 1162410, filed Dec. 23, 2011.

*Primary Examiner* — Lisa Lea Edmonds
*Assistant Examiner* — Keith Depew
(74) *Attorney, Agent, or Firm* — David D. Brush; Westman, Champln & Koehler, P.A.

(57) ABSTRACT

A device is provided for protecting an electronic printed circuit board. The device includes at least one zone of conductive contact between the printed circuit board and an element for securing the printed circuit board. The device also includes at least one elevating pad for elevating the at least one zone of conductive contact. The element for securing comes into contact with the zone of conductive contact of the printed circuit board by means of a zone of conductive contact of the elevating pad.

8 Claims, 3 Drawing Sheets

(56) References Cited

U.S. PATENT DOCUMENTS

| | | | |
|---|---|---|---|
| 6,895,509 B1 * | 5/2005 | Clark | 726/23 |
| 7,065,656 B2 * | 6/2006 | Schwenck et al. | 713/194 |
| 8,411,448 B2 * | 4/2013 | Shi et al. | 361/748 |
| 8,730,715 B2 * | 5/2014 | Katti et al. | 365/158 |
| 2010/0024046 A1 | 1/2010 | Johnson, Jr. et al. | |
| 2011/0055086 A1 * | 3/2011 | McNicoll | 705/72 |

* cited by examiner

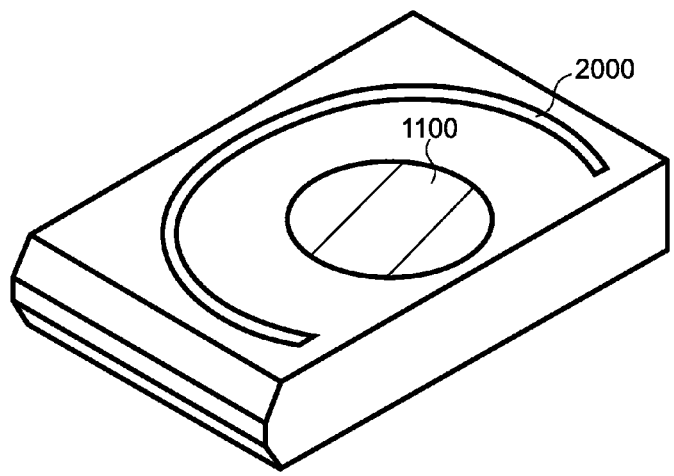
Fig. 3A
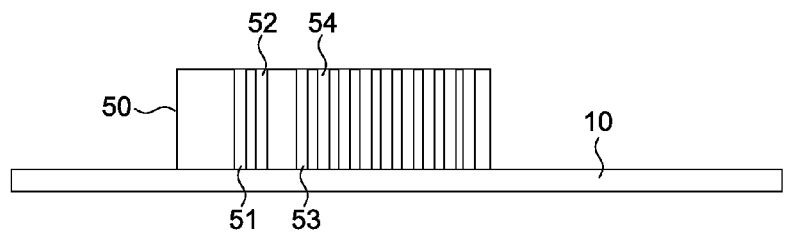
Fig. 3B
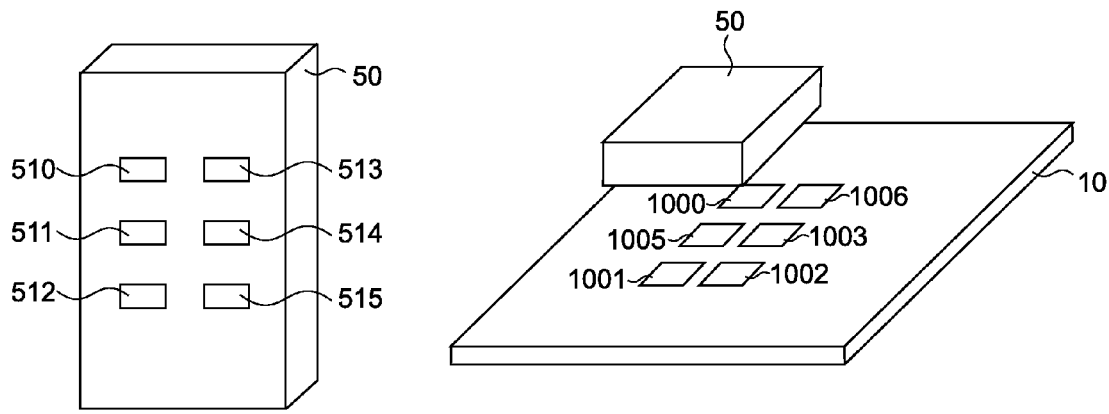
Fig. 4A         Fig. 4B ic PRINTED CIRCUIT BOARD

DEVICE FOR PROTECTING AN ELECTRONIC PRINTED CIRCUIT BOARD

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the protection of printed circuit devices. Printed circuit boards are used in numerous fields in order to make complex electronic circuits. In particular, printed circuit boards are used in many apparatuses such as payment terminals, authentication or identification devices or content-reading devices.

The present disclosure pertains more particularly to the securing of electronic printed circuit boards of such devices, in order to protect them against any intrusion by malicious third parties.

BACKGROUND OF THE DISCLOSURE

Apparatuses that integrate printed circuit boards, such as payment terminals, comprise many securing devices and implement methods for ensuring that the apparatuses are used in compliance with the uses for which they are planned and that they comply with safety standards, currently called PCI (Payment Card Industry) PED (Pin Entry Device) standards, which are laid down by certification organizations.

For example, in the field of payment terminals for payment cards, manufacturers have developed solutions for protecting the electronic printed circuit board(s) (or PCB(s)), which may or may not be multi-layered, of payment terminals.

More specifically, a printed circuit board is a support, generally a plate or board, used to electrically connect a set of electronic components together in order to obtain a complex electronic circuit. This plate comprises an assembly of one or more thin layers of copper separated by an insulating material. The layers of copper are etched by a chemical method to obtain a set of tracks, terminated by lands. The printed circuit board (of prepreg+FR4) is often coated with a layer of colored varnish, which protects the tracks from oxidation and possible short-circuits. The tracks electrically connect different zones of the printed circuit board. The lands, once perforated, set up electrical links either between the components welded through the printed circuit board or between the different layers of copper (this is the technique known as the "via" technique). In certain cases, such non-perforated lands are used to weld surface-mounted components (SMCs).

Unfortunately, deterioration has been observed in electronic printed circuit boards. This deterioration takes the form of perforation, scraping or any other intrusive technique aimed at short-circuiting, cutting, snooping, etc. on a printed circuit board.

For example, a deterioration may correspond to the cutting of a track of the printed circuit board of a payment terminal in order to cancel the sending of information aimed at activating the "attack" mode of the secured processor of a payment terminal.

In order to protect the electronic printed circuit board, protective approaches have been developed. These protective approaches include known ways especially of using copper regions on printed circuit boards which, when connected together, act as switches. These copper regions may for example take the form of conductive mechanical elements used to link up the two constituent parts of a switch. These copper regions can also take the form of flexible printed circuit protecting the printed circuit board to be secured by defining a secured enclosure. In other words, the flexible printed circuit defines a protective volume or a "a quasi-hermetic cage" preventing the intrusion of any fraudulent person or intrusive tool.

Such flexible printed circuit boards comprise for example a sort of wire mesh triggered on electrical levels. The wire mesh comprises fine adjacent tracks covering the totality of the path to be protected. For example, one track may be connected to VCC and the other to GND, and a perforation of this wire mesh may lead to cut either of the links, even to a short-circuit between the two tracks, which would also be detected. Numerous variations of this device can be used. The detection can be made on voltage levels or on the compliance of signals travelling through these tracks.

The drawback of this type of approach based on the implementation of a secured enclosure comprising a flexible printed circuit board, or a conductive mechanical element, lies in the fact that, at the localized junction between the flexible circuit and the PCB, or the localized junction between the conductive mechanical element and the PCB, a space is left free and allows a fraudulent person if any to enter and damage or modify the correct functioning of the printed circuit board.

This problem is illustrated especially in FIG. 1 pertaining to the use of a secured enclosure comprising a flexible printed circuit board.

Referring to FIG. 1, a printed circuit board (10) called a PCB comprises electronic components (101, 102, etc). The printed circuit board 10 rests on a structure 20, generally made of plastic (also called an internal case as opposed to the external case of the terminal) which makes it possible to mount the components of the terminal (card reader, keyboard, screen, printer, etc).

As mentioned here above, to secure certain of these components, a flexible circuit (30) is directly welded to the surface of the PCB (10). As can be seen in the figure, this weld (301) makes it possible to both fix the flexible circuit (30) to the PCB (10) and also to set up a contact between the flexible circuit (30) and the input (111) and the output (112) of a switch of the PCB (10) so that the security processor can receive a signal coming from the flexible circuit. This contact zone is here below called a "switch zone" (110).

As shown schematically in FIG. 1, a free space (which is of course minimal but present) localized at the weld (301) nevertheless enables an attacker to introduce either a liquid or a thin object (320) or also a conductive foil between the PCB and the flexible circuit.

Such an introduction may for example be achieved by means of a preliminary lamination of the PCB. It is therefore possible, with this technique, to simulate the right contact localized at the "switch zone" between the flexible circuit and the PCB without the security processor present on the PCB being able to perceive it. In doing so, the switches of the "switch zone" are disconnected from the flexible circuit which is thereafter no longer capable of detecting any intrusion or deterioration.

Thus, as can be seen, although the use of a flexible circuit ensures a high level of securitization, especially against perforation, there remains certain weak points especially localized at the zone of contact between the PCB and the securing element (flexible printed circuit board or conductive mechanical element) which must be corrected in order to ensure the securing of the printed circuit board.

To date, the inventors have not identified any already existing simple solution with which to obtain efficient protection of an electronic printed circuit board against such localized intrusions at the "switch zone" where the contact between the PCB and the flexible printed circuit board is set up.

SUMMARY

An exemplary aspect of the present disclosure pertains to a device for protecting an electronic printed circuit board comprising at least one zone of conductive contact between the printed circuit board and an element for securing the printed circuit board.

According to a particular embodiment, the printed circuit board also comprises at least one elevating pad for elevating the zone of conductive contact, the element for securing coming into contact with the zone of conductive contact of the printed circuit board by means of a zone of conductive contact of the elevating pad.

The term "pad for elevating" or "elevating pad" is understood to mean a part making it possible to set up electrical contact with the "switch zone" of the printed circuit board, here below called a PCB, while at the same time completely covering this zone so as to prevent any malicious attack. The pad for elevating has any unspecified shape (cylindrical, parallelepiped, cubic, etc) that is elevated, i.e. that changes the level of the zone of conductive contact with the securing element.

This elevating pad therefore contains a conductive track throughout its height making it possible to set up a contact between the "switch zone" of the PCB and the raised or elevated zone of conductive contact on the upper face of the elevating pad. The securing element connected to this raised contact zone is therefore no longer in direct contact with the surface of the PCB.

Thus, an exemplary embodiment relies on a particular device for protecting a printed circuit board making it possible to raise the zone of conductive contact between the printed circuit board and a securing element, enabling the detection of the intrusion of a malicious third party.

The weak point of the prior art localized at the junction between the PCB and the securing element is therefore modified by the height of the elevating pad, thus preventing a malicious third party from penetrating the junction between the PCB and the securing element.

According to a first aspect of the disclosure, the elevating pad comprises, on its lower face, a set of fastening elements, the location of which is central with respect to the edge of said lower face.

In other words, the fastening elements for the elevating pad are placed on the lower face of the elevating pad so as to be removed by a predetermined distance from the edge of the lower surface in order to be located as closely as possible to the center of this lower face. Thus, the point or points for fixing the elevating pad to the PCB are inaccessible, thus preventing any break-in at the interconnection of the elevating pad with the PCB.

According to another characteristic, the elevating pad comprises a guard ring corresponding to a metal track surrounding said conductive contact zone.

Thus, on the upper face of the elevating pad, the conductive contact zone setting up the contact between the PCB and the securing element is protected by a guard ring enabling detection of a lateral access to the conductive contact zone. The adding of this guard ring therefore reinforces the securing implemented by the use of the elevating pad.

According to another characteristic, the elevating pad comprises at least two vertical conductive walls laid out between the lower face of the elevating pad in contact with the printed circuit board and the upper face of the elevating pad in contact with said securing element, the two conductive walls being distributed laterally on either side of said conductive zone.

The presence of these conductive walls positioned in the thickness of the elevating pad and along its height enable the protection, from intrusive lateral perforation, of the vertical contact set up between the "switch zone" of the upper surface of the PCB fixedly joined to the lower surface of the elevating pad, and the upper surface of the elevating pad on which the zone of conductive contact with the securing element is placed.

More than two conductive walls may obviously be implemented on either side of the vertical contact set up between the "switch zone" and the "conductive contact zone" with the securing element.

Indeed, increasing the number of conductive walls makes it possible to detect any lateral perforation of the elevating pad and reinforces the protection of the PCB against such perforation.

The plurality of the conductive walls connected together then behaves like a vertical wire mesh set up in the thickness of the elevating pad.

According to an alternative embodiment, the securing element is a flexible printed circuit board. The advantage of such a securing element is that it creates a secured volume around components of the PCB.

This flexible printed circuit board can especially be connected to the conductive contact zone of the elevating pad by an appropriate tab or by one end.

According to another alternative embodiment, the securing element is a conductive mechanical element. This conductive mechanical element is for example a carbon land, or in other words a part, for example made of charged and conductive plastic enabling the switch to be closed. An absence of connection of this conductive element results in a detection of an anomaly of operation of the device for protecting the PCB and optionally to the sending of an alarm.

Advantageously, the printed circuit board comprises at least two elevating pads for elevating at least two zones of conductive contact, said at least two elevating pads having a distinct height.

Indeed, it must be noted that the protection device according to an exemplary embodiment can provide reinforced security through an increase in the number of zones of conductive contact in order to greatly increase the number of zones for monitoring intrusions if any.

Indeed, it can happen that existing devices combine different types of securing elements such as the flexible printed circuit board and the conductive mechanical element mentioned here above.

In this case, it is necessary to use as many elevating pads as there are for example flexible printed circuit board tabs or conductive mechanical elements. In order to reinforce the security of such protection devices using a large number of elevating pads, it is proposed to use pads of different heights.

Thus, a malicious third party who might succeed in circumventing an elevating pad would not be able to perform the same operations of misuse because of the change in height of the elevating pad used.

Furthermore, the variation in height of the elevating pads used, makes it possible for example to adapt the securing of the PCB to its environment, especially the shape of the casing, or also the layout of the components on the upper surface of the PCB.

Besides, it is also possible to increase the number of elevating pads in order to enable other functions, for example counter-measure functions requiring a distant contact with the PCB.

According to another form, the disclosure also relates to a payment terminal comprising a printed circuit board protection device as described here above.

BRIEF DESCRIPTION OF THE DRAWINGS

Other features and advantages shall appear more clearly from the following description of a preferred embodiment given by way of a simple illustratory and non-exhaustive example and from the appended drawings, of which:

FIGS. 3A and 3B respectively represent a top view and a view in section of the elevating pad according to one particular embodiment;

FIGS. 4A and 4B respectively represent a bottom view of the elevating pad, the lower face of which comprises elements for fastening to the PCB as well as a view in perspective of the assembling of the elevating pad and the PCB;

DETAILED DESCRIPTION OF ILLUSTRATIVE EMBODIMENTS

1. Reminder of the Principle of an Exemplary Embodiment

An embodiment of the present disclosure proposes to overcome the weak point of the prior art, namely the vulnerability of the junction between a securing element and a printed circuit board, the securing element detecting intrusions into a secured volume of the printed circuit board, here below called a PCB.

Indeed, conventionally, the zone of conductive contact between the securing element and the PCB is flush with the upper surface of the PCB and therefore, by the same token, it is accessible.

On the contrary, in one embodiment, this zone is raised by a height corresponding to the height of an elevating pad fixedly joined to the PCB in totally covering the "switch zone" of the upper surface of this PCB.

Thus, the conductive contact zone between the PCB and the securing element is relocated to a location that is not accessible to an individual who might try to introduce an object or a liquid on to this surface in order to obtain a short circuit.

2. Description of One Embodiment of a Device for Protection

Structure of the Device for Protection

Figure 2:
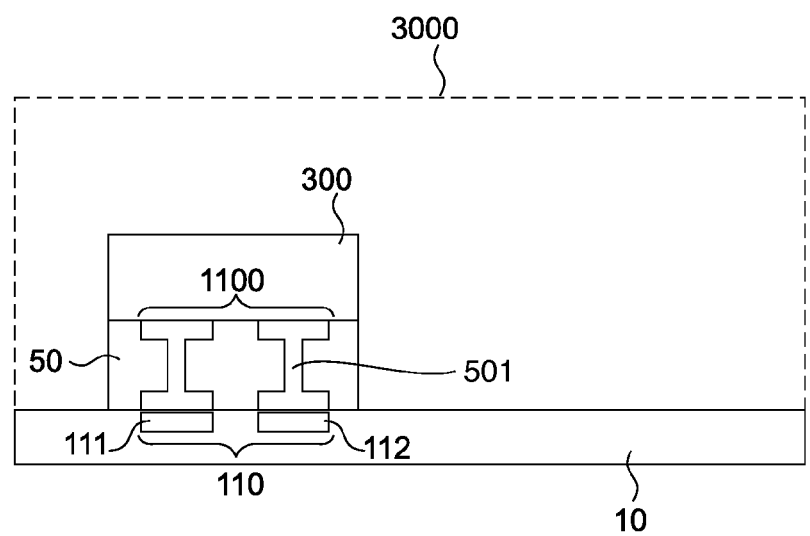
FIG. 2 is a side view of a elevating pad according to an exemplary embodiment.

Referring to FIG. 2, we present the structure of the device for protecting a printed circuit board.

Figure 1:
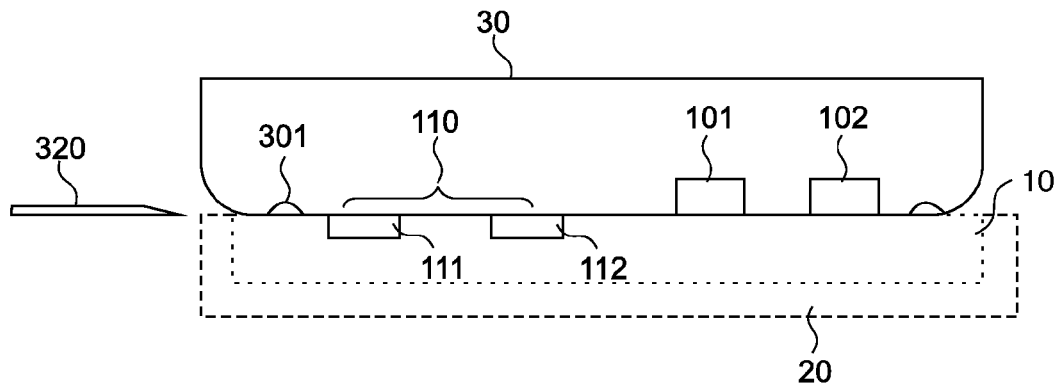
FIG. 1, already commented upon, illustrates the problems associated with the system for protecting a printed circuit board of the prior art implementing a secured enclosure.

Just as in the case of FIG. 1 pertaining to the prior art, the printed circuit board (10) called a PCB comprises electronic components (101, 102, etc) not shown. The printed circuit board 10 rests on a structure 20 (not reproduced from FIG. 1, generally made of plastic (also called an internal case as opposed to the external case of the terminal) which makes it possible to mount the components of the terminal (card reader, keyboard, screen, printer, etc).

As mentioned here above, to secure some of these components, a securing element (300) (for example and non-exhaustively a flexible printed circuit board or also a conductive mechanical element) is used and connected to the PCB (10).

Unlike FIG. 1, pertaining to the prior art, which provides for a connection of the securing element by a weld (301), an exemplary embodiment of the present disclosure proposes to use an elevating pad (50) making it possible to relocate the zone of conductive contact between the securing element (300) and the PCB.

Indeed, as shown in FIG. 2, the elevating pad is connected to the "switch zone" (110) of the PCB and comprises a vertical contact (501) set up between the "switch zone" of the upper surface of the PCB fixedly joined to the lower surface of the elevating pad, and the upper surface of the elevating pad on which the conductive contact zone with the securing element is positioned.

Thus, the zone of conductive contact (1100) between the securing element, enabling the detection of an intrusion, and the PCB is raised relatively to the upper surface of the PCB by a distance equal to the height of the elevating pad.

The conductive contact zone is thereby protected by the secured chamber 3000 set up by the securing element.

Elements for Fastening the Elevating Pad

Referring respectively to FIGS. 4A and 4B, we present a bottom view (FIG. 4A) of the elevating pad (50), the lower face of which comprises fastening elements (510, 511, 512, 513, 514, 515) to the PCB (10) as well as a view in perspective of the assembling of the elevating pad and of the PCB.

Indeed, the elevating pad comprises for example, according to this embodiment, two contact areas (510, 511, 512, and 513, 514, 515) that are to be respectively welded to the "switching" areas (1001, 1005, 1006, and 1002, 1003, 1004) of the PCB (10).

Advantageously, the locating of these areas is central with regard to the elevating pad (50), and in other words these areas are removed by a predetermined distance of security from the edges of the lower face of the elevating pad so as to prevent any attempt at intrusion aimed at making contact with these areas.

For example, the minimum security distance to be complied with is about 2 mm.

Thus, the "switch zone" (110) of the upper face of the PCB is entirely covered by the elevating pad and inaccessible to a malicious third party.

The elevating pad plays the role of an element for elevating the "switch zone" (110) towards the conductive contact zone (1100) raised by the height of the elevating pad (50).

3. Alternative Embodiments

Improvements of the Protection Device

In order to reinforce the protection provided by the elevating pad proposed according to an exemplary embodiment, several elements can be added within the elevating pad (50).

These elements are especially presented with reference to FIGS. 3A and 3B.

Thus, with reference to FIG. 3A, the elevating pad comprises a guard ring (2000) corresponding to a metal track (2000) surrounding the conductive contact zone (1100) raised by the height of this elevating pad. Thus, on the upper surface of the elevating pad, the conductive contact zone (1100) setting up the contact between the PCB (10) and the securing element (300) is protected by a guard ring (2000) used to detect lateral access to the conductive contact zone.

The adding of this guard ring therefore reinforces the securing implemented by the use of the elevating pad.

Referring to FIG. 3B, the elevating pad can also include at least two vertical conductive walls (51, 52, 53, 54) extending between the lower face of the elevating pad (50) in contact with the PCB (10) and the upper face of the elevating pad in contact with said securing element, the two conductive walls being for example laterally distributed on either side of said conductive zone.

The presence of these conductive walls placed in the thickness of the elevating pad and along its height enables the protection, against intrusive lateral perforation, of the vertical contact set up between the "switch zone" of the upper surface of the PCB (10) fixedly joined to the lower face of the elevating pad (50) and the upper surface of the elevating pad (50) on which the conductive contact zone (1100) with the securing element is positioned.

More than two conductive walls can obviously be implemented on either side of the vertical contact (501) set up between the switch zone (110) and the zone of conductive contact (1100) with the securing element.

Indeed, the increase in the number of the conductive walls enables the detection and reinforcement of the protection of the PCB against a lateral perforation of the elevating pad.

The plurality of conductive walls connected to one another then behaves like a vertical wire mesh set up within the thickness of the elevating pad.

A combination of the guard ring (2000) and the conductive walls can obviously be implemented within the elevating pad in order to increase the level of protection provided by it.

Type of Securing Element

Figure 5:
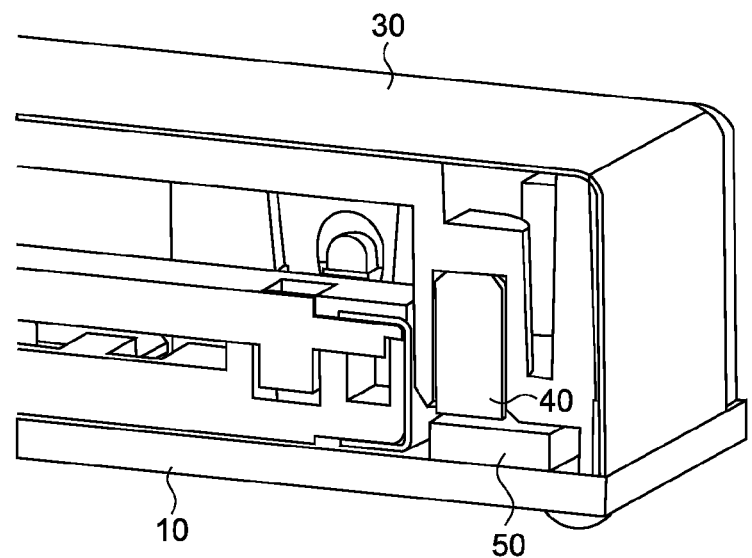
FIG. 5 shows the different types of securing elements of the device for protecting the printed circuit board according to an exemplary embodiment.

Referring to FIG. 5, we present a protection device having two securing elements.

Indeed, the securing element can be a flexible printed circuit board (30) and/or a conductive mechanical element (40).

Should a flexible printed circuit board be used, then a secured volume is created around the components of the PCB.

The flexible printed circuit board can especially be connected to the conductive contact zone of the elevating pad by an appropriate tab (not shown) or by an end (not shown).

According to another alternative embodiment, when the securing element is a conductive mechanical element, it is for example a carbon land.

The absence of a connection of this conductive element to the elevating pad results in the detecting of an anomaly of operation of the device for protecting the PCB and optionally the sending of a warning and/or the implementation of securing measures (erasure of the secured memory for example).

Payment Terminal

Figure 6:
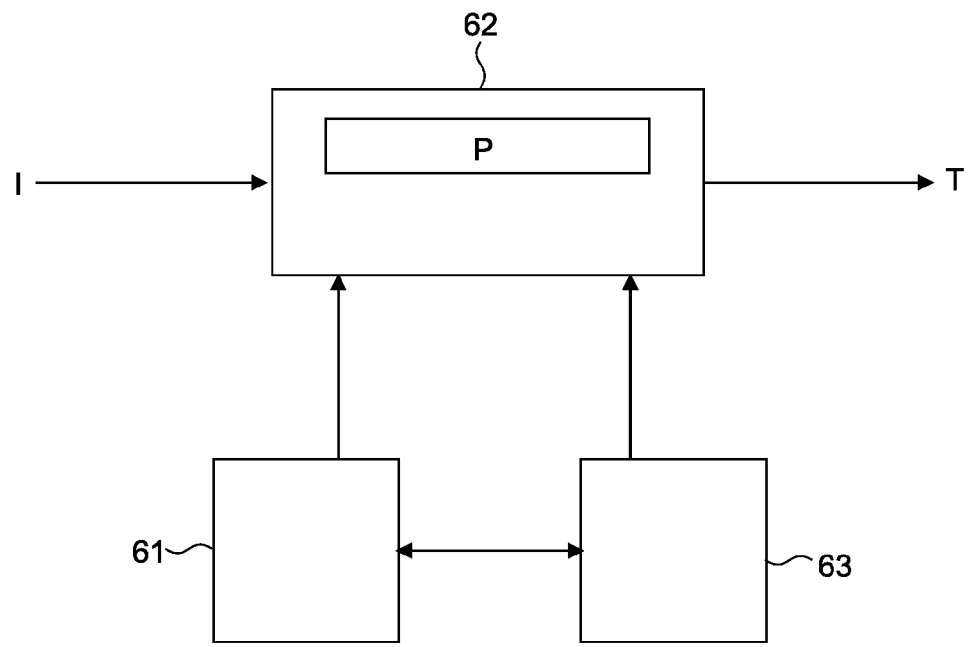
FIG. 6 is a schematic view of a payment terminal according to an exemplary embodiment.

Referring to FIG. 6, we present an embodiment of a payment terminal according to the disclosure.

Such a terminal comprises a memory 61 comprising a buffer memory, a processing unit 62, equipped for example with a processor P, and driven by the computer program 63 implementing the method for protecting according to the disclosure.

At initialization, the code instructions of the computer program 63 are for example loaded into a RAM and then executed by the processor of the processing unit 62. The processing unit 62 inputs at least one piece of information I such as the identifiers of the locating zones. The microprocessor of the processing unit 62 implements the steps of the method for protecting described here above according to the instructions of the computer program 63 to deliver a processed piece of information T such as the detection of an attack leading to the elimination of the protection data. To this end, the terminal comprises, in addition to the buffer memory 61, at least one device for protecting an electronic printed circuit board of the payment terminal, said device for protecting comprising at least one zone of conductive contact between the printed circuit board and a securing element of the printed circuit board and at least one pad for elevating the conductive contact zone.

This protection device is driven by the microprocessor of the processing unit 62.

Although the present disclosure has been described with reference to one or more examples, workers skilled in the art will recognize that changes may be made in form and detail without departing from the scope of the disclosure and/or the appended claims.

The invention claimed is:

1. A device for protecting an electronic printed circuit board, wherein the device comprises:
    a flexible printed circuit board configured to secure the printed circuit board,
    a zone of conductive contact between said electronic printed circuit board and said flexible printed circuit board, and
    at least one elevating pad, which elevates said zone of conductive contact above a surface of said electronic printed circuit board, wherein said flexible printed circuit board electrically contacts said zone of conductive contact, and said zone of conductive contact is electrically connected to a switch zone of said electronic printed circuit board by at least one conductive contact extending through said at least one elevating pad.

2. The device for protecting an electronic printed circuit board according to claim 1, wherein said at least one elevating pad comprises, on its lower face, a set of fastening elements, the location of which is central with respect to an edge of said lower face.

3. The device for protecting an electronic printed circuit board according to claim 1, wherein said at least one elevating pad comprises a guard ring corresponding to a metal track surrounding said zone of conductive contact of said at least one elevating pad.

4. The device for protecting an electronic printed circuit board according to claim 1, wherein said at least one elevating pad comprises at least two vertical conductive walls laid out between a lower face of said at least one elevating pad in contact with the printed circuit board and an upper face of said at least one elevating pad in contact with said flexible printed circuit board, said at least two conductive walls being distributed laterally on either side of said conductive zone.

5. The device for protecting an electronic printed circuit board according to claim 1, further comprising a conductive mechanical element configured to secure the electronic printed circuit board and electrically connected to the conductive zone.

6. The device for protecting an electronic printed circuit board according to claim 1, wherein said electronic printed circuit board comprises at least two elevating pads for elevating at least two zones of conductive contact, said at least two elevating pads having distinct heights.

7. A payment terminal comprising the device for protecting according to claim 1.

8. The device for protecting an electronic printed circuit board according to claim 1, wherein:
- the switch zone comprises a first contact and a second contact on the surface of the electronic printed circuit board;
- the flexible printed circuit board circuit is electrically connected between the first and second contacts via the zone of conductive contact.

\* \* \* \* \*